United States Patent
Bludau (10) Patent No.: US 11,247,328 B2
(45) Date of Patent: Feb. 15, 2022

(54) METHOD AND APPARATUS FOR AUTOMATICALLY DETECTING GRIPPER POSITIONS

(71) Applicant: SICK AG, Waldkirch (DE)

(72) Inventor: Thomas Bludau, Waldkirch (DE)

(73) Assignee: SICK AG, Waldkirch (DE)

( * ) Notice: Subject to any disclaimer, the term of this patent is extended or adjusted under 35 U.S.C. 154(b) by 335 days.

(21) Appl. No.: 16/515,376

(22) Filed: Jul. 18, 2019

(65) Prior Publication Data
US 2020/0061804 A1 Feb. 27, 2020

(30) Foreign Application Priority Data
Aug. 24, 2018 (EP) ..................... 18190779

(51) Int. Cl.
*G05B 19/04* (2006.01)
*G05B 19/18* (2006.01)
(Continued)

(52) U.S. Cl.
CPC ............. *B25J 9/0081* (2013.01); *B25J 15/00* (2013.01)

(58) Field of Classification Search
CPC .. F15B 15/28; F15B 15/2807; F15B 15/2861; F15B 19/002; F15B 19/005; H05B 1/02;
(Continued)

(56) References Cited

U.S. PATENT DOCUMENTS

2004/0226183 A1* 11/2004 Sielemann .......... F15B 15/2861
33/708
2006/0009878 A1* 1/2006 Kobayashi ............ B25J 9/1671
700/245
(Continued)

FOREIGN PATENT DOCUMENTS

CN 112706183 A * 4/2021
DE 3632151 * 3/1988
(Continued)

OTHER PUBLICATIONS

Kopacek, P. et al. "Programmierbarer Robotergreifer"; Elektrotechnik Und Informationstechnik; pp. 526-531; Jul. 1, 1996 ; English Abstract Attached.
(Continued)

*Primary Examiner* — Harry Y Oh
(74) *Attorney, Agent, or Firm* — Nath, Goldberg & Meyer; Jerald L. Meyer (57) ABSTRACT

In order to provide an improved method and device to facilitate the teach-in of gripper positions, it is suggested that the positions be automatically detected. The procedure shall include:
- starting a teach-in process,
- detecting the position and the direction of movement of the actuating element on its path with a sensor,
- performing gripping movements from one position to another and stopping the gripper in each of the positions,
- storing the position of the actuating element when the gripper stops and storing the direction of movement from which this position was approached as the associated direction of movement,
- stopping the teach-in process when as many different positions with the associated movement directions have been stored as there are gripper positions,
- assigning of the gripper positions to the three positions from the stored positions and the stored, associated movement directions.

11 Claims, 4 Drawing Sheets

(51) Int. Cl.
*B25J 9/00* (2006.01)
*B25J 15/00* (2006.01)

(58) Field of Classification Search
CPC ...... H05B 2214/02; H05B 3/145; H05B 3/40; G05D 23/19; G05B 2219/39466; B25J 15/00; B25J 9/0081; B25J 9/1612; B25J 9/20; G01R 33/0094; G01D 3/021; G01D 5/145
See application file for complete search history.

(56) References Cited

U.S. PATENT DOCUMENTS

| | | | | |
|---|---|---|---|---|
| 2017/0173789 | A1* | 6/2017 | Kilibarda | ............... B25J 13/085 |
| 2018/0193017 | A1* | 7/2018 | Lenihan | ............. A61B 17/0467 |
| 2018/0345483 | A1* | 12/2018 | Sirkett | .................. B25J 9/1697 |

FOREIGN PATENT DOCUMENTS

| | | | |
|---|---|---|---|
| DE | 3632151 | A1 | 3/1988 |
| EP | 3147737 | A1 | 3/2017 |

OTHER PUBLICATIONS

European Search Report dated Feb. 25, 2019 for corresponding EP Application No. 18190779.1.

* cited by examiner

METHOD AND APPARATUS FOR AUTOMATICALLY DETECTING GRIPPER POSITIONS

The invention concerns a method and a device for the automatic recognition of gripper positions, namely a first position corresponding to a stand-by state in which no object is gripped, at least a second position corresponding to a gripped object, and a third position corresponding to a gripped object in which no object is gripped although it should have been gripped.

Grippers for which knowledge of the gripper positions is important are often so-called jaw grippers, e.g. from robots. Mechanical jaw grippers are used in the automation industry for a variety of handling tasks. A distinction is made between internal and external grippers. External grippers grip an object from the outside. The gripper can assume the states "jaws open", "object gripped" and "jaws closed".

Internal grippers grip a hollow object from the inside. The inner gripper can take on the same states as the outer gripper, but the individual positions have a different meaning, because e.g. "jaws open" for an outer gripper means "stand by" and for an inner gripper it means "gripping past the object". For the user, only the following states are actually interesting:

Gripper in idle position ("idle")→no object is to be gripped;
Gripper has gripped object ("object")→an object was successfully gripped;
Gripper has reached past object ("no object")→The jaws have closed beyond the expected object (external gripper) or opened beyond (internal gripper).

The problem for the user now is that he has to teach-in each of these three states manually. This process is very time-consuming and elaborate because the individual gripper is moved to the corresponding position and a teach-in command is sent to a sensor which detects the position of the gripper. The sensor then stores this position so that it can later give a corresponding signal "idle", "object" or "no object" during operation when this position of the gripper is detected.

Based on this prior art, it is the object of the invention to provide an improved process and a corresponding device which can simplify the teaching-in of the positions.

The object is achieved by a method with the features of claim 1 and a device with the features of claim 4.

The subject matter of the inventive method of automatically detecting a first gripper position corresponding to an idle state in which no object is gripped, at least a second gripper position in which an object is gripped and a third gripper position in which no object is gripped although it should have been gripped, wherein the gripper movement from one position to another is reducible to a linear movement along a path of movement of an actuator and a gripper position corresponds to a position of the actuator on the path of movement, comprises the steps of:

starting a teach-in process,
detecting with a sensor the position and the direction of movement of the actuating element on its path,
performing gripping movements from one position to another and stopping the gripper in each of the positions,
storing the position of the actuating element when the gripper stops and storing the direction of movement from which this position was approached as the associated direction of movement,
stopping the teach-in process when as many different positions have been saved with the associated movement directions as there are gripper positions,
assigning the gripper positions to the three positions from the stored positions and the stored associated movement directions.

The main advantage of the inventive method is that the gripper states are taught-in automatically, regardless of whether the gripper is an external gripper or an internal gripper and regardless of the starting position of the gripper. At the end of the procedure, the gripper positions "idle", "object" and "no object" are taught-in and known to the system. All the user has to do is start the teach-in process. The teach-in process is thus enormously accelerated and simplified, so that even untrained personnel can carry it out.

A further advantage is that several second gripper positions can also be taught-in, i.e. the gripping of objects of different sizes is possible, whereby the objects can also be distinguished via the second gripper positions.

It is advantageous if the method includes a step of entering the number of different objects to be gripped or the number of second gripper positions, so that different teach-in processes corresponding to the number of different objects can be carried out.

It is advantageous if the sensor generates a monotonous signal (i.e. monotonously rising or falling) over the movement path, so that the positions along the movement path can be sorted according to size for the assignment of the gripper positions to the positions. Then the second gripper position is assigned to the middle position, or the second gripper positions are assigned to the middle positions. The third gripper position is assigned to the one of the two remaining edge positions for which the same direction of movement has been stored as for the middle position or middle positions. The first gripper position is assigned to the remaining edge position.

In an embodiment of the invention, after the teach-in process and during normal operation, the positions of the actuating element are stored when the gripper stops. An average value is formed from all stored values corresponding to a gripper position and this average value is taken as the future value for the position. This has the advantage that the inventive method can not only be used for teaching-in the states, but also for tracking the gripper positions during runtime. For this purpose, the procedure is also continued during the running time and each detected position is assigned to the corresponding gripper position via an average value filter. Thus, the robustness of the system consisting of gripper and sensor can be significantly improved during runtime, since tolerances caused by wear can be ignored or taken into account automatically.

It is a further object to provide a device for carrying out the aforementioned method, the device comprising:

an input means for starting the teach-in process,
a sensor which detects the position and the direction of movement of the actuating element over the path of movement,
a memory for storing the position when the gripper stops in each of the three positions and for storing the direction of movement from which that position was approached, and
an evaluation unit which is designed to stop the teach-in process when as many different positions as there are gripper positions have been stored and is designed to assign the gripper positions to the positions as a function of the stored positions and the movement directions associated with the positions.

In a simple advantageous way, the actuator is a cylinder piston of a pneumatic or hydraulic cylinder, and the sensor detects the position of the cylinder piston.

The sensor can be a known, reliable magnetic field sensor or inductive sensor that detects the trajectory and generates a signal depending on the position of the actuator.

It is particularly advantageous if the sensor integrally contains the evaluation unit and the memory. Then the intelligence, i.e. here the knowledge of the gripper positions, does not have to be outsourced externally to a robot controller.

Another special advantage of the invention is that the sensor for detecting the positions of the actuating element can be arranged at any position. The sensor must only be able to detect the actuating element along the entire movement path. For the installation you only have to fix the sensor, usually this will be (somewhere) in a mounting groove of a working cylinder, and start the teach-in process. These two steps are so simple that they can be performed by unskilled personnel.

In the following, the invention will be explained in detail with reference to the drawing and to embodiments. In the drawing it is shown.

Figure 2:
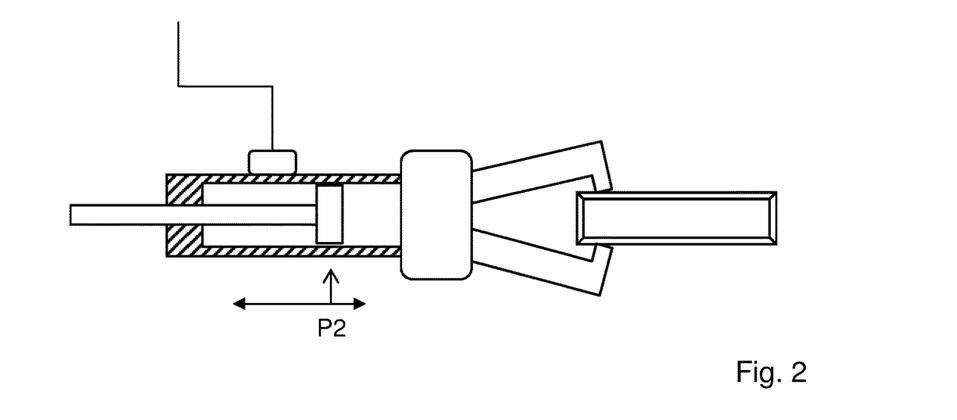
Figure 3:
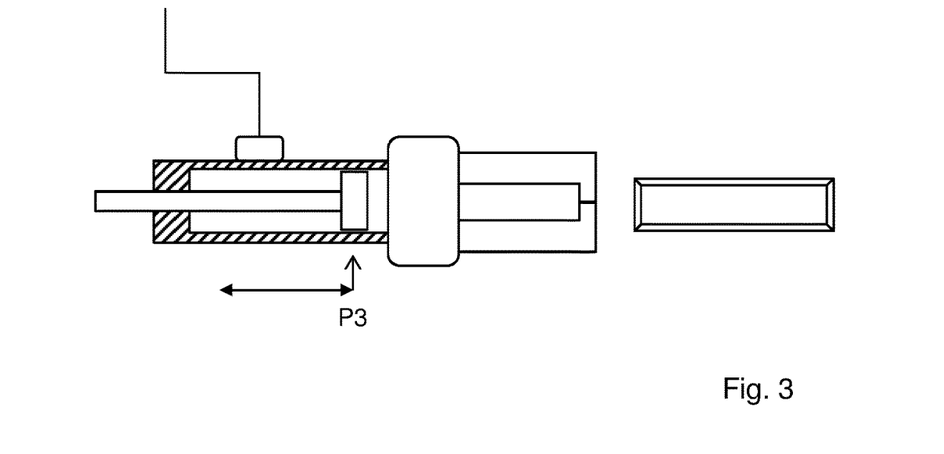
Figure 4:
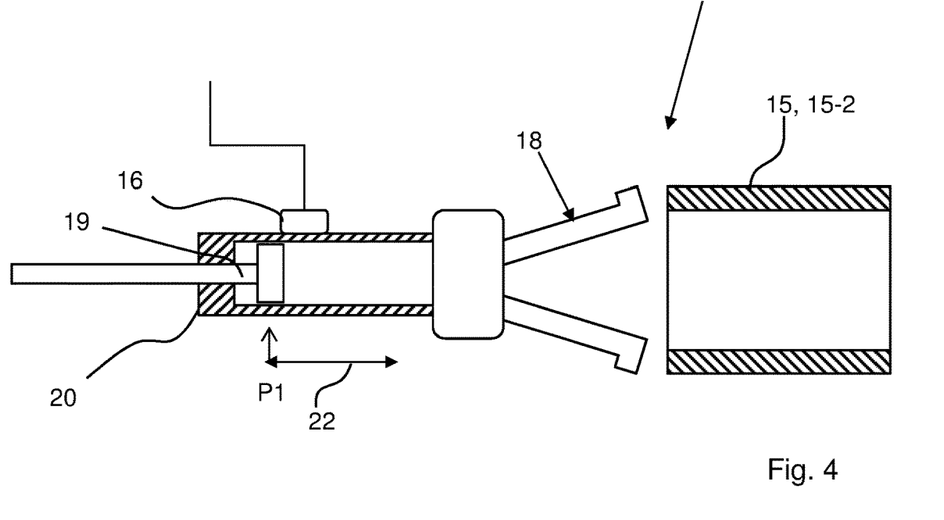
FIGS. 4 to 6 schematic representations of various positions of a gripper designed as an internal gripper.
Figure 5:
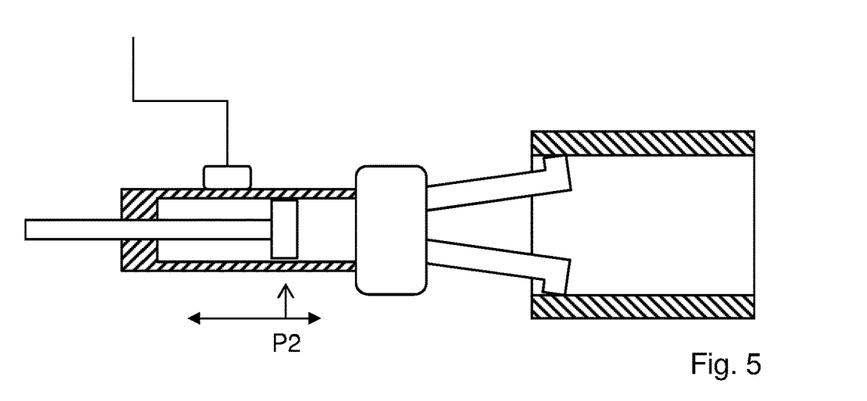
Figure 6:
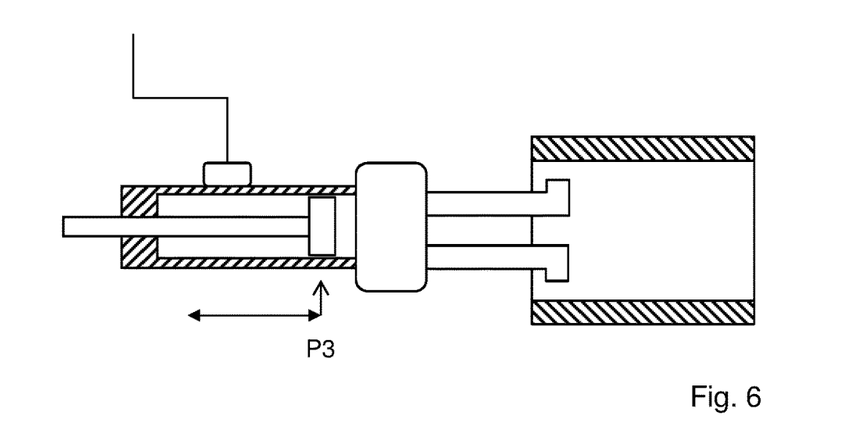

The invention concerns a gripper 10, which can be an external gripper 12 as shown in FIGS. 1 to 3 and 8 to 12 or an internal gripper 14 as shown in FIGS. 4 to 6. For these grippers 10, it is important to know the gripper positions of gripper elements 18 for operation, i.e. whether an object 15 was gripped, whether the object 15 was passed or whether the gripper elements 18 are in the rest position. The following states are therefore relevant for the user:

Gripper elements 18 in idle position ("idle")→object 15 not gripped;

Gripper elements 18 have gripped object 15 ("object")→object 15 has been successfully gripped;

Gripper elements 18 have gripped past object 15 ("no object")→the gripper elements 18 have closed (external gripper) or opened (internal gripper) beyond the expected object 15.

Since external grippers grip an object 15-1 from the outside and internal grippers grip an object 15-2 just vice versa from the inside, the gripper states "jaws open", "object gripped" and "jaws closed" correspond to different gripper positions. "jaws open" (as in FIG. 1) can mean "idle" for an external gripper, and "no object" (as in FIG. 4) for an internal gripper.

In order to provide the user with only the three relevant positions "idle", "object" and "no object" in a simple manner, regardless of the type of gripper, the invention proposes the following solution.

It should first be noted that the gripper movement can be reduced from one position to another to a linear movement along a movement path of an actuating element and that a robot gripper position corresponds to a position of the actuating element on the movement path. In the embodiments of the invention, the actuating element is designed as a piston 19, which moves in a cylinder 20 along its stroke path 22 (movement path). It goes without saying that the stroke path is finite because, of course, either the gripper 10 has a maximum open position or a maximum closed position and strikes against these, or the stroke path is finite and the piston 19 strikes against these ends. In any case, a reversal of movement takes place at these stopping points, i.e. if the actuating element is at one end of the stroke, the gripper is maximally open and at the other end the gripper is maximally closed. The gripper positions "idle", "object" or "no object" correspond to positions P1, P2 or P3 according to FIGS. 1 to 3 in the case of the external gripper. P1 and P3 correspond here to the maximum deflections of the piston 19. The numbering of the positions is random and depends on the chronological order in which the positions are taught-in, as will become clear below. In the embodiment according to FIGS. 1 to 3, P1 corresponds to "idle" (gripper fully open), P2 corresponds to "object", and P3 corresponds to "no object" (gripper fully closed). In the case of the internal gripper 14 according to the example in FIGS. 4 to 6, "idle" corresponds to P3, "object" to P2 and "no object" to P1.

Figure 7:
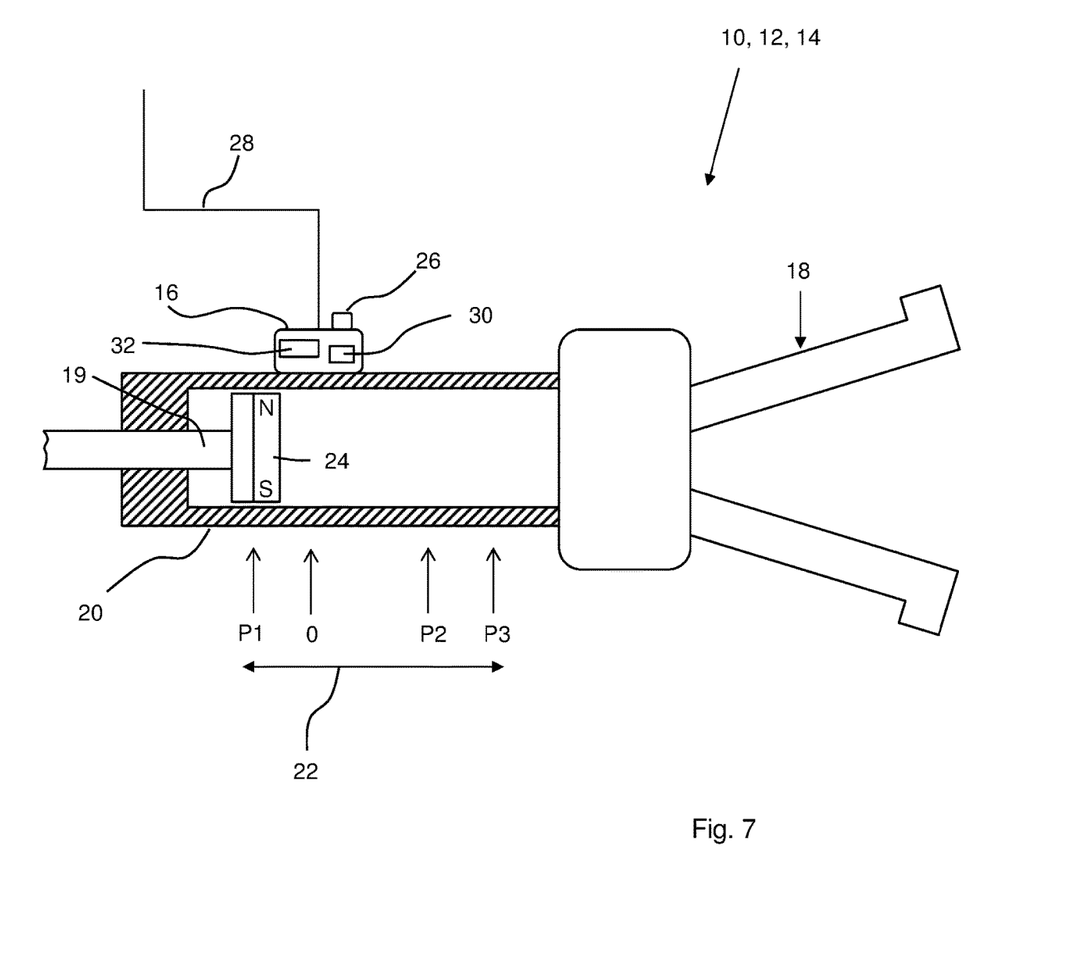
FIG. 7 a schematic representation of a device according to the invention.
Figure 8:
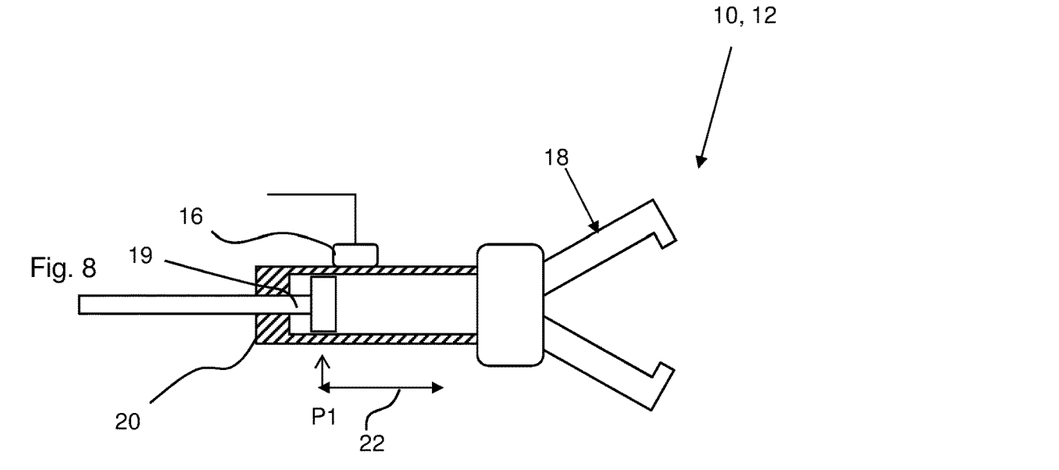
FIGS. 8 to 12 representations as FIGS. 1 to 3 for teaching-in several second gripper positions for gripping objects of different sizes.
Figure 9:
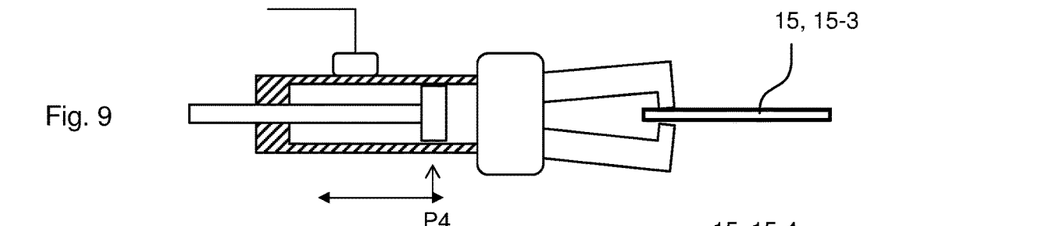
Figure 10:
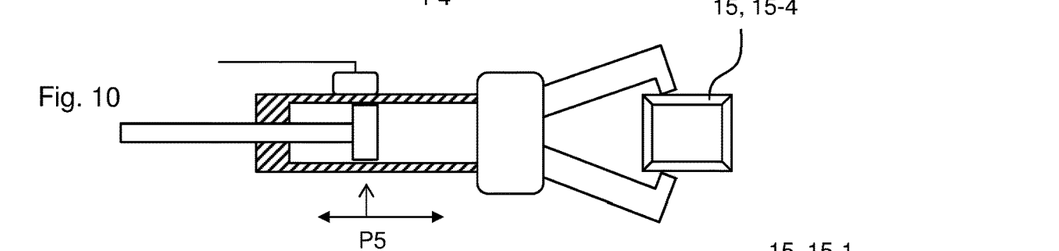

According to the inventive subject matter, a sensor 16 is provided, which is shown slightly larger in FIG. 7. The sensor 16 has a detection range which is so large that it can detect the piston 19 of the working cylinder 20 over the entire stroke 22 (movement path). For this purpose, a permanent magnet 24 is arranged on the piston 19, via whose magnetic field the sensor 16 can detect the position of the piston 19 magnetically or inductively. This sensor principle is state of the art. In principle, the mounting position of the sensor 16 in the longitudinal direction of the stroke 22 on the working cylinder 20 is arbitrary as long as the piston 19 with the permanent magnet 24 is within the detection range of the sensor 16 over the entire stroke 22.

The sensor 16 internally generates a monotonic detection signal, i.e. monotonously rising or falling, over the movement path, i.e. over the stroke 22, so that position and detection signal correlate one-to-one. Finally, the detection signal corresponding to a certain position can be transmitted to the outside via a data link 28.

The sensor 16 has an input device 26 for starting a teach-in process described later.

The input means 26 is shown in FIG. 7 as actuating knob 26. However, it can also be software-based and transmitted to sensor 16 via data connection 28.

The sensor 16 also has a memory 30 for storing the positions P1, P2 and P3 of the piston 19 (actuator). The positions are located along the movement path, which here is formed by the stroke 22, and are measured with the sensor position as zero point. For the examples from the figures, P1 is negative and P1<P2<P3.

The memory 30 also serves to determine the direction of movement of the piston 19 and to store its directions of movement. A direction of movement is saved when a position is also saved. The direction of movement is the one from which the stored position was approached. In this context, this direction of movement is also referred to as the direction of movement associated with the stored position. If, for example, a piston movement to the right is defined as a positive movement direction and e.g. P2 in FIG. 7 is approached from the zero point, i.e. in positive direction, then a positive movement direction to P2 is stored. In the teach-in process, a position and the associated direction of movement are only stored during the first start-up and are then no longer overwritten during the subsequent teach-in process.

The sensor also has an integrated evaluation unit 32. The evaluation unit 32 performs the entire evaluation and is designed to stop the teach-in process when the different positions P1, P2 and P3 have been found and stored. How to find the positions is described below. Finally, the evaluation unit 32 is also designed to assign the gripper positions "idle", "object" and "no object" to the positions P1, P2 and P3. The assignment depends on the stored positions P1, P2 and P3 and the movement directions belonging to the positions, as also explained using the procedure described below.

The inventive procedure for the automatic recognition of the gripper positions "idle", "object" and "no object" comprises the following steps:

The first step is to start the teach-in process.

In a second step, the positions and directions of movement of the piston 19 on its trajectory 22 are detected by a sensor 16.

In a third step, gripping movements are carried out, whereby these movements take place from one of the three positions to another and the gripper 10 stops in each of the gripper positions. For example, the gripper 10 stops when the piston 19 (actuating element) is in position P2, because the gripper 10 grips object 15-1 and the gripper jaws cannot close any further. The gripper also stops when the piston is at P1 and P3 because, as explained above, this corresponds to the stop points of the stroke or gripping movement. Thus the end positions are always taught in and correspond to "maximum open gripper position" or "maximum closed gripper position".

In a fourth step, the stop of the piston 19 is detected by the sensor 16 and the position of the piston 19 (actuator) is stored at this stop. If a position is saved in this way, the associated direction of movement from which this position was approached is also saved at the same time. If a position is approached several times during the teach-in process, it is not stored several times, but was only saved the first time it was approached.

The position stored first after starting the teach-in process is given the designation P1, the second P2 and the third P3. The numbering of the positions is therefore arbitrary and simply depends on the position of the piston 19 when the teach-in process is started.

are assigned to the three positions P1, P2 and P3. This assignment is made solely from the stored positions and stored movement directions.

The three stored positions are sorted by size. In the case of the embodiments of the figures, the result of the sorting in each of the embodiments is P1<P2<P3. That the numbering here is also correlated with the order of magnitude is, as said, coincidence, because the embodiments according to FIGS. 1 to 6 were chosen in such a way and it was assumed that the position furthest to the left in the figures was taught-in first and the position furthest to the right was taught in last.

The middle one of these positions sorted according to size corresponds to the second gripper position "object", because the gripping of object 15-1 or 15-2 always lies between the idle position "idle" and the gripping past the object "no object". In the embodiments according to FIGS. 1 to 6, this is P2 both times.

The two remaining positions P1 and P3 are edge positions. The third gripper position "no object" is assigned to the one of these two positions for which the same direction of movement has been stored as for the middle position P2, because "no object" is always approached from the same direction as "object". In the case of the embodiment of FIGS. 1 to 3 with the external gripper, "no object" corresponds to position P3 (FIG. 3). In the case of the embodiment of FIGS. 4 to 6 with the internal gripper, "no object" corresponds to position P1 (FIG. 4).

The remaining other edge position, in the example with the external gripper it is P1 (FIG. 1) and in the case of the internal gripper it is P3 (FIG. 6), corresponds to the first gripper position "idle".

With these rules, the gripper positions "idle", "object" and "no object" are always correctly assigned to the positions P1, P2 and P3. Depending on the position at which the sensor 16 is arranged along the stroke 22 and the numbering of the positions, certain assignments result which are listed in their entirety in the following table:

| sorting positions | Direction Position 1 | Direction Position 2 | Direction Position 3 | Position 1 | Position 2 | Position 3 |
| --- | --- | --- | --- | --- | --- | --- |
| P1 > P2 > P3 | positive | positive | negative | no object | object | idle |
| P1 > P2 > P3 | positive | negative | negative | idle | object | no object |
| P1 > P3 > P2 | positive | negative | positive | no object | idle | object |
| P1 > P3 > P2 | positive | negative | negative | idle | no object | object |
| P2 > P1 > P3 | positive | positive | negative | object | no object | idle |
| P2 > P1 > P3 | negative | positive | negative | object | idle | no object |
| P2 > P3 > P1 | negative | positive | positive | idle | no object | object |
| P2 > P3 > P1 | negative | positive | negative | no object | idle | object |
| P3 > P1 > P2 | positive | negative | positive | object | idle | no object |
| P3 > P1 > P2 | negative | negative | positive | object | no object | idle |
| P3 > P2 > P1 | negative | positive | positive | idle | object | no object |
| P3 > P2 > P1 | negative | negative | positive | no object | object | idle |

If as many different positions with the associated movement directions are stored as there are different gripper positions, the teach-in process is stopped; in the above-mentioned example, three positions. "Different" in this case means that the individual positions are further apart than a suitably defined tolerance window. In the embodiment according to FIGS. 1 to 6 there are three different positions, since only one object is to be gripped.

If the positions and associated movement directions are stored, the gripper positions "idle", "object" and "no object"

Figure 1:
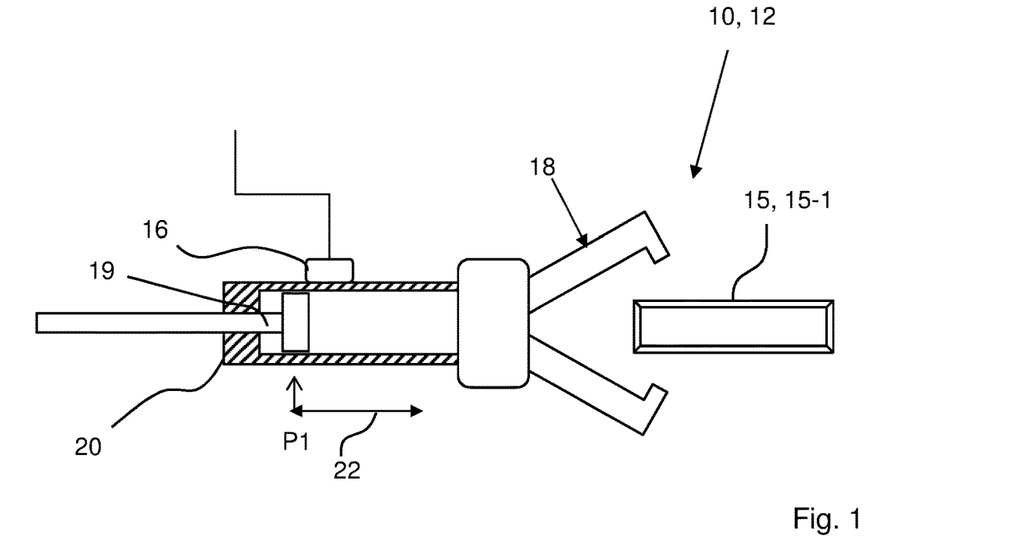
FIGS. 1 to 3 a schematic representations of various positions of a gripper designed as an external gripper for gripping an object.

The embodiment with the external gripper according to FIGS. 1 to 3 can be found in the penultimate line and the embodiment with the internal gripper according to FIGS. 4 to 6 can be found in the last line.

Now, a further example of execution is to be considered, which is shown in FIGS. 8 to 12 and which also belongs to the invention.

This applies to the case in which gripper positions for several objects of different sizes are to be taught-in. In the embodiment there are three differently sized objects 15-1, 15-3 and 15-4. Object 15-1 is medium sized, object 15-4 is larger and object 15-3 smaller. By "large", "larger" and "smaller" we only mean that the gripper elements 18 of the outer gripper 10 of the larger object 15-4 are closed less far to grip the object 15-4 than with the medium-sized object 15-1 and even more so than with the even smaller object 15-3.

A total of five positions must then be taught in, namely
idle,
object1 (object 15-1 was gripped),
object3 (object 15-3 was gripped),
object4 (object 15-4 was gripped),
no object.

Figure 11:
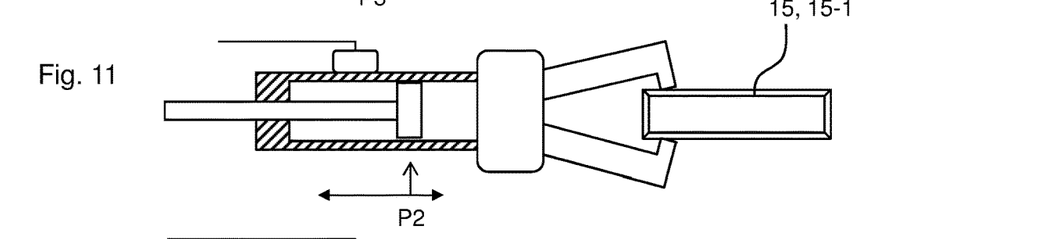
Figure 12:
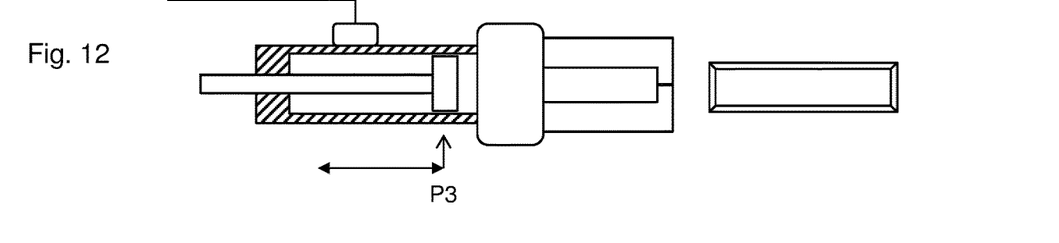

This is done in exactly the same way and with the same rules as explained for the above embodiments according to FIGS. 1 to 3 and 4 to 6. The teach-in process is started first. Then the positions and directions of movement of the piston 19 on its path of movement 22 are detected with the sensor 16. Gripping movements are carried out, whereby these movements take place from one of the five positions to another and the gripper 10 stops in each of the gripper positions. When stopping, the respective position of the piston 19 and the associated direction of movement are stored. In reality this can be done in such a way that after starting the teach-in process, the gripper performs 10 gripping movements and, depending on whether and which object 15 is held in front of the gripper 10, the gripper 10
opens the gripper elements (FIG. 8),
grips into emptiness (FIG. 12),
grips the small object 15-3 (FIG. 9),
grips the large object 15-4 (FIG. 10),
grips the medium-sized object 15-1 (FIG. 11).

After several gripping cycles and once each of the three objects has been gripped, the five positions P1 to P5 are stored as well as the associated directions of movement. Only the following combinations may have been saved:
Position P1 with direction of movement negative,
Position P2 with direction of movement positive,
Position P3 with direction of movement positive,
Position P4 with direction of movement positive,
Position P5 with direction of movement positive.

Just as the numbering of the stored positions is selected in this embodiment, P1 was first approached (FIG. 8) and stored during the teach-in process, then object 15-1 was gripped (FIG. 11) and P2 was stored, then the gripper element 18 must have been opened again and emptiness was gripped (FIG. 12) and P3 stored. In the next gripping cycle, object 15-3 was gripped and P4 stored, and finally object 15-4 was gripped and P5 stored.

Then as many different positions with the associated movement directions are stored as there are different gripper positions, namely five.

Now the gripper positions "idle", "object1", "object2", "object3" and "no object" are assigned to the five positions P1 to P5.

The sizing results: P1<P5<P2<P4<P3.

The three middle positions, sorted according to size, correspond to the second gripper positions "object", of which there are three, since three objects of different sizes are to be gripped. The sorting of sizes allows at the same time an assignment to the objects. The largest object 15-4, i.e. the second gripper position "object4", must correlate with position P5 and, analogously, the second gripper position "object1" with P2 and the second gripper position "object3" with P4.

Now the edge positions P1 and P3 remain. P3 has the same assigned direction of movement as the "object" positions. Therefore the third gripper position "no object" is assigned to P3. Finally, the assignment to P1 remains for "idle".

The teach-in process is now complete and the gripper positions have been automatically detected.

In a further embodiment of the invention, after the teach-in process and during normal operation, the positions of the actuating element 18 are stored when the gripper 10 stops. An average value is formed from all stored values corresponding to a gripper position and this average value is taken as the future value for the position. Thus, the inventive method can not only be used for teaching-in the states, but also for tracking the gripper positions during runtime. Thus, the robustness of the system consisting of gripper and sensor can be significantly improved during runtime, since wear-related tolerances are automatically taken into account.

What is claimed is:

1. An automatic detection method, comprising the steps of:
providing a gripper configured to move between a first gripper position, a second gripper position, and a third gripper position, wherein the first gripper position corresponds to an idle state in which no object is gripped by the gripper, wherein the second gripper position corresponds to an object state in which the object is gripped by the gripper, and wherein the third gripper position corresponds to a no-object state in which the gripper has made a faulty attempt to grip the object;
initiating a teaching process, wherein the teaching process comprises:
moving an actuating element associated with the gripper along a linear movement path, wherein each of the first, second and third gripper positions respectively corresponds to a unique position of the actuator element on the linear movement path;
detecting with a sensor a linear position and a direction of movement of the actuating element as it travels along the linear movement path;
stopping the movement of the actuating element when the gripper achieves the first gripper position;
storing the linear position and the direction of movement of the actuating element along the linear movement path corresponding to the first gripper position;
resuming movement of the actuating element along the linear movement path after the linear position and the direction of movement of the actuating element along the linear movement path corresponding to the first gripper position has been stored;
stopping the movement of the actuating element when the gripper achieves the second gripper position;
storing the linear position and the direction of movement of the actuating element along the linear movement path corresponding to the second gripper position;
resuming movement of the actuating element along the linear movement path after the linear position and the direction of movement of the actuating element along the linear movement path corresponding to the second gripper position has been stored;
stopping the movement of the actuating element when the gripper achieves the third gripper position;
storing the linear position and the direction of movement of the actuating element along the linear movement path corresponding to the third gripper position; and resuming movement of the actuating element along the linear movement path after the linear position and the direction of movement of the actuating element along the linear movement path corresponding to the third gripper position has been stored;

stopping the teaching process when the respective linear positions and directions of movement of the actuating element corresponding to the first, second and third gripper positions are stored; and assigning the respective linear positions and directions of movement of the actuating element corresponding to the first, second and third gripper positions stored during the teaching process to actuating positions and directions of movement of the actuating element corresponding to the gripper respectively achieving the first, second and third gripper positions.

2. The method according to claim 1, wherein the positions and directions of movement of the actuating element corresponding to the gripper respectively achieving the first, second and third gripper positions respectively comprise a first position and a first direction, a second position and a second direction, and a third position and a third direction, wherein the first, second and third positions are ranked such that the second position is positioned between the first and third positions, wherein a linear actuation path of movement of the actuating element has opposed first and second ends, the third position being assigned to one of the first and second ends having a direction associated therewith equal to the second direction, and the first position being assigned to the other one of the first and second ends.

3. The method according to claim 1, wherein the teaching process further comprises the steps of:

stopping the movement of the actuating element when the gripper achieves at least one auxiliary second gripper position, wherein the at least one auxiliary gripper position corresponds to an auxiliary object state in which at least one additional object is gripped by the gripper, wherein the at least one additional object has a size different from the object;

storing a linear position and a direction of movement of the actuating element along the linear movement path corresponding to the at least one auxiliary second gripper position; and resuming movement of the actuating element along the linear movement path after the linear position and the direction of movement of the actuating element along the linear movement path corresponding to the at least one auxiliary second gripper position has been stored, and wherein the step of assigning further comprises assigning the linear position and direction of movement of the actuating element corresponding to the at least one auxiliary second gripper position stored during the teaching process to an actuating position and direction of movement of the actuating element corresponding to the gripper respectively achieving the at least one auxiliary second gripper position.

4. The method according to claim 1, wherein, following the teaching process, the sensor monitors subsequent linear positions and directions of movement of the actuating element corresponding to the first, second and third gripper positions, the subsequent linear positions and directions of movement of the actuating element being averaged to update the actuating positions and directions of movement of the actuating element corresponding to the gripper respectively achieving the first, second and third gripper positions.

5. A device for automatic detection of gripper position, comprising:

input means;

a gripper configured to move between a first gripper position, a second gripper position, and a third gripper position, wherein the first gripper position corresponds to an idle state in which no object is gripped by the gripper, wherein the second gripper position corresponds to an object state in which the object is gripped by the gripper, and wherein the third gripper position corresponds to a no-object state in which the gripper has made a faulty attempt to grip the object;

an actuating element associated with the gripper;

a sensor;

computer readable memory; and an evaluation unit configured to:

initiate a teaching process, wherein the teaching process comprises:

moving the actuating element along a linear movement path, wherein each of the first, second and third gripper positions respectively corresponds to a unique position of the actuator element on the linear movement path;

detecting with the sensor a linear position and a direction of movement of the actuating element as it travels along the linear movement path;

stopping the movement of the actuating element when the gripper achieves the first gripper position;

storing the linear position and the direction of movement of the actuating element along the linear movement path corresponding to the first gripper position in the computer readable memory;

resuming movement of the actuating element along the linear movement path after the linear position and the direction of movement of the actuating element along the linear movement path corresponding to the first gripper position has been stored;

stopping the movement of the actuating element when the gripper achieves the second gripper position;

storing the linear position and the direction of movement of the actuating element along the linear movement path corresponding to the second gripper position in the computer readable memory;

resuming movement of the actuating element along the linear movement path after the linear position and the direction of movement of the actuating element along the linear movement path corresponding to the second gripper position has been stored;

stopping the movement of the actuating element when the gripper achieves the third gripper position;

storing the linear position and the direction of movement of the actuating element along the linear movement path corresponding to the third gripper position in the computer readable memory; and resuming movement of the actuating element along the linear movement path after the linear position and the direction of movement of the actuating element along the linear movement path corresponding to the third gripper position has been stored;

stop the teaching process when the respective linear positions and directions of movement of the actuating element corresponding to the first, second and third gripper positions are stored in the computer readable memory; and assign the respective linear positions and directions of movement of the actuating element corresponding to the first, second and third gripper positions stored during the teaching process to actuating positions and directions of movement of the actuating element corresponding to the gripper respectively achieving the first, second and third gripper positions.

6. The device according to claim 5, wherein the actuating element is a cylinder piston of a pneumatic or a hydraulic cylinder.

7. The device according to claim 5, wherein the sensor is a magnetic field sensor or an inductive sensor.

8. The device according to claim 5, wherein the evaluation unit and the computer readable memory are integral parts of the sensor.

9. The device according to claim 6, wherein the sensor is a magnetic field sensor or an inductive sensor.

10. The device according to claim 6, wherein the evaluation unit and the memory are integral parts of the sensor.

11. The device according to claim 9, wherein the evaluation unit and the memory are integral parts of the sensor.

* * * * *